United States Patent
Perry et al.

(10) Patent No.: US 12,282,718 B2
(45) Date of Patent: Apr. 22, 2025

(54) APPARATUS AND METHOD FOR GENERATING A MANUFACTURABILITY ANALYSIS

(71) Applicant: PROTOLABS, INC., Maple Plain, MN (US)

(72) Inventors: Austin Perry, Maple Plain, MN (US); Joshua Knutson, Maple Plain, MN (US); Robert Ford, Maple Plain, MN (US); Samuel Bosak, Maple Plain, MN (US); Shuji Usui, Maple Plain, MN (US)

(73) Assignee: Proto Labs, Inc., Maple Plain, MN (US)

( * ) Notice: Subject to any disclaimer, the term of this patent is extended or adjusted under 35 U.S.C. 154(b) by 0 days.

(21) Appl. No.: 18/208,145

(22) Filed: Jun. 9, 2023

(65) Prior Publication Data
US 2024/0411963 A1    Dec. 12, 2024

(51) Int. Cl.
*G06F 30/27*    (2020.01)
*G06F 119/18*    (2020.01)

(52) U.S. Cl.
CPC .......... *G06F 30/27* (2020.01); *G06F 2119/18* (2020.01)

(58) Field of Classification Search
CPC ............................. G06F 30/27; G06F 2119/18
See application file for complete search history.

(56) References Cited

U.S. PATENT DOCUMENTS

| | | | |
|---|---|---|---|
| 10,061,299 B2 | 8/2018 | Herrman | |
| 10,466,681 B1 * | 11/2019 | Jones | G05B 19/40937 |
| 10,482,382 B2 * | 11/2019 | Seaton | G06N 5/022 |
| 11,086,292 B2 | 8/2021 | Coffman | |
| 11,256,231 B2 * | 2/2022 | Crothers | G05B 13/0265 |
| 11,347,201 B2 | 5/2022 | Coffman | |
| 2006/0253214 A1 * | 11/2006 | Gross | G06F 30/00 |
| | | | 705/26.1 |
| 2015/0127131 A1 * | 5/2015 | Herrman | G06Q 30/0283 |
| | | | 700/98 |
| 2015/0254693 A1 * | 9/2015 | Kozhukhin | B22D 46/00 |
| | | | 705/7.35 |
| 2019/0065629 A1 * | 2/2019 | Phinney | G06F 30/10 |
| 2020/0159886 A1 * | 5/2020 | ReMine | G06F 30/15 |
| 2020/0272129 A1 * | 8/2020 | Crothers | G05B 19/4099 |
| 2020/0342152 A1 * | 10/2020 | Van der Velden | G06F 30/27 |

(Continued)

*Primary Examiner* — Nha T Nguyen
(74) *Attorney, Agent, or Firm* — Caldwell Intellectual Property Law

(57) ABSTRACT

An apparatus for generating a manufacturability analysis is disclosed. The apparatus includes at least a processor and a memory communicatively connected to the at least a processor. The memory contains instructions configuring the at least a processor to receive a computer model that is representative of a part for manufacture, wherein the computer model comprises a plurality of model based definitions. The memory instructs the processor to transmit the computer model to a graphics processing unit (GPU). The memory instructs the processor to generate a manufacturability analysis as a function of the plurality of the model based definitions, wherein the manufacturability analysis is generated using the GPU. The memory instructs the processor to generate an adjusted computer model as a function of the manufacturability analysis and the computer model.

18 Claims, 8 Drawing Sheets

(56) References Cited

U.S. PATENT DOCUMENTS

| | | | |
|---|---|---|---|
| 2020/0401113 A1* | 12/2020 | Yuan | G05B 19/41865 |
| 2021/0174408 A1* | 6/2021 | Usui | G06F 18/23 |
| 2021/0303743 A1* | 9/2021 | Usui | G06F 30/27 |
| 2022/0004678 A1* | 1/2022 | Harris | B33Y 50/00 |
| 2022/0113689 A1* | 4/2022 | Behandish | G06F 30/10 |
| 2022/0214668 A1* | 7/2022 | King | G06F 30/20 |
| 2022/0347930 A1* | 11/2022 | Paddock | B33Y 50/02 |
| 2023/0055428 A1* | 2/2023 | Nordell | G05B 19/4097 |
| 2023/0240943 A1* | 8/2023 | Perano | A61J 1/202 |
| | | | 220/4.07 |

\* cited by examiner

APPARATUS AND METHOD FOR GENERATING A MANUFACTURABILITY ANALYSIS

FIELD OF THE INVENTION

The present invention generally relates to the field of manufacturability analysis. In particular, the present invention is directed to an apparatus and method for generating a manufacturability analysis.

BACKGROUND

Computer-aided drawings typically convey information about a to-be-fabricated structure, such as a part or an assembly of components of a part. These parts included in a computer-aided drawing may or may not be easily manufactured. Ambiguities between the part as designed and what is possible for a manufacturer is not easily attainable with consistent accuracy.

SUMMARY OF THE DISCLOSURE

In an aspect, an apparatus for generating a manufacturability analysis is disclosed. The apparatus includes at least a processor and a memory communicatively connected to the at least a processor. The memory contains instructions configuring the at least a processor to receive a computer model that is representative of a part for manufacture, wherein the computer model comprises a plurality of model based definitions. The memory instructs the processor to transmit the computer model to a graphics processing unit (GPU). The memory instructs the processor to generate a manufacturability analysis as a function of the plurality of the model based definitions, wherein the manufacturability analysis is generated using the GPU. The memory instructs the processor to generate an adjusted computer model as a function of the manufacturability analysis and the computer model.

In another aspect, a method for generating a manufacturability analysis is disclosed. The method includes receiving, using at least a processor, a computer model that is representative of a part for manufacture, wherein the computer model comprises a plurality of model based definitions. The method additionally includes transmitting, using the at least a processor, the computer model to a graphics processing unit (GPU). The method then generates, using the GPU, a manufacturability analysis as a function of the plurality of the model based definitions, wherein the manufacturability analysis is generated using the GPU. The method also includes generating, using the at least a processor, an adjusted computer model as a function of the manufacturability analysis and the computer model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for generating a manufacturability analysis is disclosed. The apparatus includes at least a processor and a memory communicatively connected to the at least a processor. The memory contains instructions configuring the at least a processor to receive a computer model that is representative of a part for manufacture, wherein the computer model comprises a plurality of model based definitions. The memory instructs the processor to transmit the computer model to a graphics processing unit (GPU). The memory instructs the processor to generate a manufacturability analysis as a function of the plurality of the model based definitions, wherein the manufacturability analysis is generated using the GPU. The memory instructs the processor to generate an adjusted computer model as a function of the manufacturability analysis and the computer model. Exemplary embodiments illustrating aspects of the present disclosure are described below in the context of several specific examples.

Figure 1:
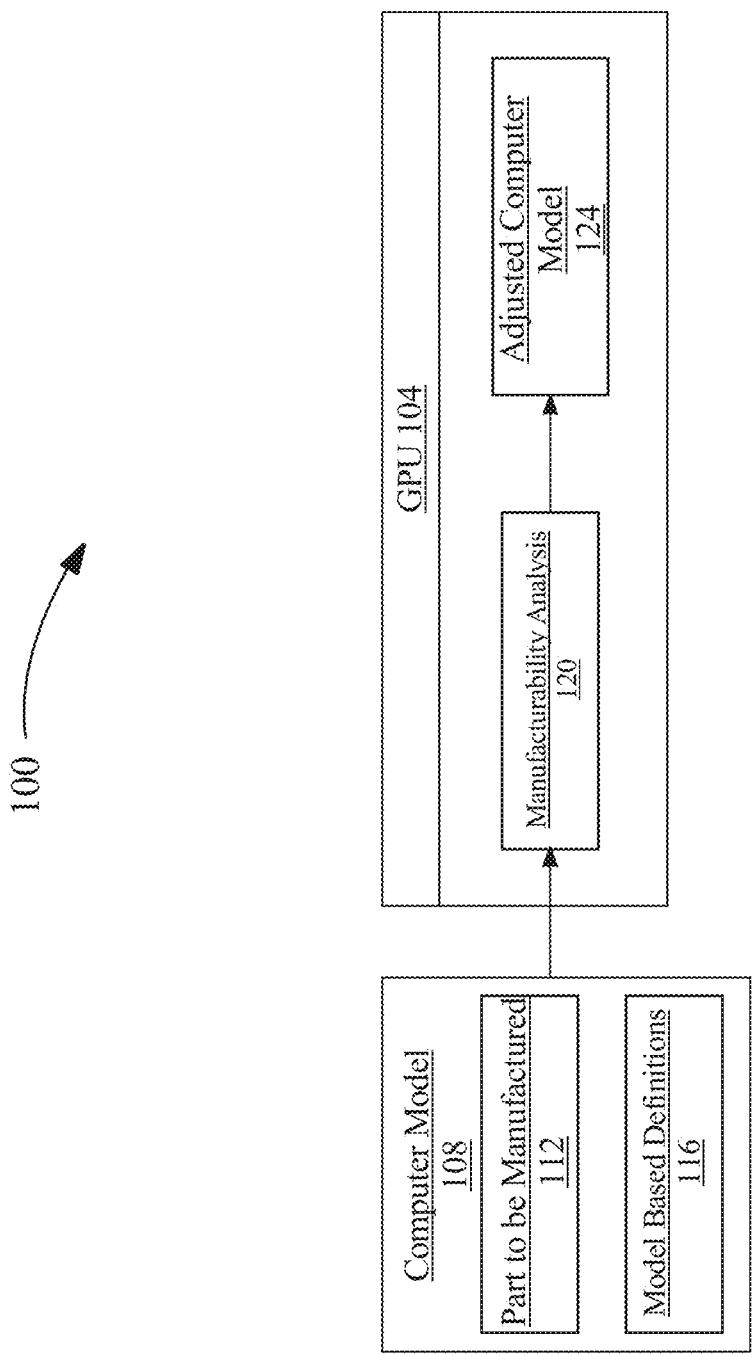
FIG. 1 is a block diagram of an exemplary embodiment of an apparatus for generating a manufacturability analysis.

Referring now to FIG. 1, an exemplary embodiment of apparatus 100 for generating a manufacturability analysis is illustrated. Apparatus 100 includes a graphics processing unit (GPU) 104. A "graphics processing unit," as used in this disclosure, is a device with a set of specific hardware capabilities that are intended to map well to the way that various 3D engines execute their code, including ray tracing, geometry setup and execution, texture mapping, memory access, and/or shaders. GPU 104 may be a processor, wherein a processor may include any processor as described in the entirety of this disclosure. GPU 104 may include, without limitation, a specialized electronic circuit designed to rapidly manipulate and alter memory to accelerate the creation of images in a frame buffer. For instance, and without limitation, GPU 104 may include a computer chip that performs rapid mathematical calculations, primarily for the purpose of rendering images. GPU 104 may further include, without limitation, ray tracing, full scene anti-aliasing (FSAA) to smooth the edges of 3-D objects and anisotropic filtering (AF) to make images look crisper. GPU 104 may include, without limitation, dedicated graphics cards, integrated graphics cards, hybrid graphics cards, and/or any combination thereof. Unlike a Central Processing Unit that is optimized for handling general-purpose tasks, GPU 104 is optimized for parallel computing and is specifically designed to perform many calculations simultaneously. It may be used in a wide range of applications that require heavy computational loads such as scientific simulations, machine learning, and cryptocurrency mining.

Still referring to FIG. 1, GPU 104 may include any computing device as described in this disclosure, including without limitation a microcontroller, microprocessor, digital signal processor (DSP) and/or system on a chip (SoC) and/or graphics processer unit (GPU) as described in this disclosure. Computing device may include, be included in, and/or communicate with a mobile device such as a mobile telephone or smartphone. GPU 104 may include a single computing device operating independently, or may include two or more computing device operating in concert, in parallel, sequentially or the like; two or more computing devices may be included together in a single computing device or in two or more computing devices. GPU 104 may interface or communicate with one or more additional devices as described below in further detail via a network interface device. Network interface device may be utilized for connecting GPU 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. GPU 104 may include but is not limited to, for example, a computing device or cluster of computing devices in a first location and a second computing device or cluster of computing devices in a second location. GPU 104 may include one or more computing devices dedicated to data storage, security, distribution of traffic for load balancing, and the like. GPU 104 may distribute one or more computing tasks as described below across a plurality of computing devices of computing device, which may operate in parallel, in series, redundantly, or in any other manner used for distribution of tasks or memory between computing devices. GPU 104 may be implemented using a "shared nothing" architecture in which data is cached at the worker, in an embodiment, this may enable scalability of apparatus 100 and/or computing device.

With continued reference to FIG. 1, GPU 104 may be designed and/or configured to perform any method, method step, or sequence of method steps in any embodiment described in this disclosure, in any order and with any degree of repetition. For instance, GPU 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. GPU 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, GPU 104 may be configured to employ parallel computing capabilities. As used in the current disclosure, "parallel computing" is the computing capability of a GPU 104 to do a plurality calculations or processes simultaneously. Parallel computing enables GPU 104 to break complex problems into thousands or millions of separate tasks and work them out all at once instead of one-by-one like a CPU needs to. In a non-limiting example, parallel computing may be accomplished using Compute Unified Device Architecture (CODA). CUDA is a parallel computing platform and application programming interface (API) that allows software to use certain types of graphics processing units (GPUs) for general purpose processing, an approach called general-purpose computing on GPUs (GPGPU). CUDA is a software layer that gives direct access to the GPU's instruction set and massive parallelism computation, for the execution of compute kernels. CUDA is designed to work with programming languages such as C, C++, and Fortran. This accessibility allows parallel programming to use GPU resources beyond graphics rendering, in contrast to prior APIs like Direct3D and OpenGL, which are limited to graphic rendering operation and unable to extend to the massive parallel.

Still referring to FIG. 1, GPU 104 may be organized into an array of streaming multiprocessors (SMS). A Streaming Multiprocessor (SM) is a functional block within a GPU 104 that is responsible for executing parallel threads of code. Each streaming multiprocessor may include processing units called streaming processors or CUDA cores. The number of CUDA cores in each SM can vary depending on the GPU 104 model, with high-end GPUs having more SMs with more CUDA cores per SM. The SM may be responsible for scheduling and executing parallel threads, managing the memory hierarchy, and performing other tasks necessary for efficient GPU computation. The SM's ability to execute many threads in parallel is crucial for achieving high performance in CUDA applications. A non-limiting example, streaming multiprocessor may include an NVIDIA H100 graphics processing unit (GPU) that has 16,896 CUDA cores or streaming processors. When CUDA kernel is called, the CUDA runtime system launches a grid of threads that execute the kernel code. A CUDA kernel is a function that is executed on the GPU 104 using the CUDA parallel computing platform. It may be a piece of code that runs in parallel across multiple threads on the GPU, enabling efficient and high-performance computations. The threads are assigned to streaming multiprocessors on a block-by-block basis. All threads in the block are simultaneously assigned to the same streaming multiprocessor. To ensure that all blocks in a grid get executed, the runtime system maintains a list of blocks that need to execute and assigns new blocks to streaming multiprocessors when a previously assigned block completes execution. The assignment of threads to SMs may be done on a block-by-block basis. Which guarantees that threads in the same block are scheduled simultaneously on the same streaming multiprocessors. This may guarantee that threads within the block interact and synchronize with other thread within the block. At the block level, the CUDA runtime system may execute blocks in any other relative to each other since none of them need to wait for each other. This flexibility enables scalable implementation of parallel algorithms. In a higher-end implementation with more execution resources, one can execute many blocks at the same time. The ability to execute the same application code with wide range of speeds allows With continued reference to FIG. 1, GPU 104 may be configured to generate bounding volume hierarchy (BVH). "Bounding volume hierarchy" as used in the current disclosure, is a technique used in computer graphics and 3D rendering to speed up collision detection, ray tracing, and other geometric operations by reducing the number of computations needed to determine whether objects are intersecting or overlapping. BVH may group objects together into larger volumes called bounding volumes, such as spheres or axis-aligned boxes. These volumes may then be arranged hierarchically, with smaller volumes contained within larger volumes. This creates a tree-like structure, with the root node representing the entire scene and the leaf nodes representing the individual objects. When performing geometric operations, the algorithm traverses the BVH tree, starting from the root node and descending down to the leaf nodes. At each level, the algorithm checks whether the current bounding volume intersects with the test volume. If it does not intersect, then the algorithm can skip that part of the tree and move to the next level. If it does intersect, the algorithm continues to traverse the tree until it reaches the leaf nodes, which contain the actual geometry data. GPU 104 may be configured to rasterize depth buffer or dexel buffer by streaming ray and boundary representation intersection along with BVH. The ray and boundary representation intersection computations are scheduled block by block and executed in parallel in the stream. GPU 104 may be configured to compute tool collision detection algorithm with BVH on GPU. In the GPU 104 collision detection stream, each CUDA core examines the collision of the tool against the workpiece, and the tool holder against the workpiece. By carrying out millions of tool locations and orientations in the stream, optimum part orientation and required tool orientations are attained.

With continued reference to FIG. 1, GPU 104 may be configured to carry out material removal simulation. The material removal simulation may be used to subtract material along the tool reachable zone. In an embodiment, this may be done by starting using larger diameter roughing tools progressively moving smaller tools, removed volumes by tool data is obtained by the GPU material removal simulation. A material removal simulation may include removal volume data. As used in the current disclosure, "removed volume data" is data that is associated with the quantity of material that needs to be removed to machine a part. Removed volume data may additionally describe the tooling that may be used to remove the material. The removed volume data may be used to estimate manufacturing cost, tool selection, and machine selection. In an embodiment, removed volume data may also include unreachable residual material on the part. GPU 104 may be configured to compute cutting force in milling operation. Using the removed volume data a GPU 104 may calculate the cutting area, the cutting speed, the rake angles, and the back rake angles, for the part to be manufactured. GPU 104 may compute parameters and cutting forces by querying a database. GPU 104 may be configured to compute the tool deflection and the workpiece deflection using these forces on physics based model such as finite element method. GPU 104 may be configured to predict unstable behavior of milling, which is referred as chattering.

With continued reference to FIG. 1, a memory is communicatively connected to the at least a GPU 104. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Continuing to refer to FIG. 1, GPU 104 is configured to receive a computer model 108 representing a part for manufacture 112. Computer model 108 may include a plurality of sides. A "part for manufacture," as used in this disclosure, is a part to be manufactured, wherein manufacturing may include any manufacturing process as described in the entirety of this disclosure. The part may include any item made of materials such as metals including, for example, aluminum and steel alloys, brass, and the like, plastics, such as nylon, acrylic, ABS, Delrin, polycarbonate, and the like, foam, composites, wood, etc. A "computer model," as described herein, is a digital model of a physical structure created using computer-aided design (CAD) modeling software. Computer model 108 may include a three-dimensional image of part for manufacture 112. As used in this disclosure, a "three-dimensional image" is an image having, appearing to have, or displaying three dimensions, such as length, width, and height. For example and without limitation, computer-aided design (CAD) software may include SOLIDWORKS® software and/or CATIA software (available from Dassault Systèmes SolidWorks Corp, Waltham, Massachusetts), AUTOCAD® software and/or Fusion 360 software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. Computer model 108 may further include any data describing and/or relating to a computer model of the part to be manufactured.

Computer model 108 may include any modeling type, such as, without limitation, a wireframe, solid model and/or any combination thereof. Computer model 108 may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. Computer model 108 may further include information about the geometry and/or other defining properties of the structure of part for manufacture 112. Computer model 108 may include a polygon mesh, such as a collection of vertices, edges, and faces, that define the shape of computer model 108. For example and without limitation, the faces of the polygon mesh may include triangles, such as a triangle mesh, quadrilaterals, or other simple convex polygons.

Still referring to FIG. 1, computer model 108 may include a plurality of sides of part for manufacture 112. Each side of the plurality of sides, as used in this disclosure, may be a view of computer model 108 from a plane orthogonal to an axis passing through an origin of computer model 108. The axis may include, as a non-limiting example, a three-axis coordinate system, such as the x-axis, y-axis, and z-axis, or abscissa, ordinate, and applicate. Persons skilled in the art, upon reviewing the entirety of this disclosure, will be aware of axes which may be suitable for use as each side of the plurality of sides consistently with this disclosure. The "origin" of the computer model, as described herein, is a fixed point of reference for computer model 108. For example and without limitation, the origin may include the center of mass, the geometric center, the center of a feature of the part, wherein a feature may be a hole, a well, a groove, a pocket, a channel, extruded volume, and the like. As a further example and without limitation, the origin may include any position of computer model 108.

Still referring to FIG. 1, the computer model 108 may include a plurality of model-based definitions 116. As used in the current disclosure, a "model-based definition" is an annotation within the computer model 108 that is used to define a individual component or feature of the part for manufacture 112. Defining an individual component or element may include information regarding geometric dimensioning and tolerancing (GD&T) information, component level materials, assembly level bills of materials, engineering configurations, surface finish, weld symbol, engineering history/change orders, legal/proprietary notices, manufacturing processes, design intent, semantic data, and the like. As used in the current disclosure, a "geometric dimensioning and tolerance" is information for defining and communicating engineering tolerances and relationships within a part for manufacturer 112. Geometric dimensioning and tolerancing information may include an acceptable range of sizes, heights, depths, widths, lengths, radius, circumferences, angles, pitches, and the like for each controlled feature of the component. GD&T may be used to define the nominal (theoretically perfect) geometry of parts and assemblies, to define the allowable variation in form and possible size of individual features, and to define the allowable variation between features. There are several standards available worldwide that describe the symbols and define the rules used in GD&T. One such standard is American Society of Mechanical Engineers (ASME) Y14.5. As used in the current disclosure, an "assembly level bill of materials" is a complete list of the components of a part to manufacture 112. An assembly level bill of materials may comprise all of the components required in an assembly. As used in the current disclosure, a "component material" is a material that a component is made of. For example, a component may be made of a plurality of metals and or plastics. Component Materials may additionally include the quality or quantity of the materials used for a given component. An individual component or element of a part for manufacture 112 may have a plurality of Model-based definitions 116. In a non-limiting example, a part for manufacture 112 may include a metal arm. GPU 104 may encode onto the metal arm a plurality of model-based definitions 116 that require the arm to have an architectural finish and designating the type of weld used to attach the metal arm to the rest of the part for manufacture 112. Model-based definitions 116 may be represented within the computer model 108 representing a part for manufacture 112. Model-based definitions 116 may be consistent with ASME standards, specifically ASME Y 14.41 In embodiments, Model-based definitions 116 may be visible to the user within the computer model 108 and readable by GPU 104 and other manufacturing equipment. Model-based definitions 116 may be used to determine the manufacturability of the part to be manufactured 112. Model-based definitions 116 may also be used to generate a manufacturing estimate of the part to be manufactured 112. In some embodiments, model-based definitions 116 may be within the meta data of the computer model 108. Model-based definitions 116 may additionally be calculated by GPU 104 and then encoded into computer model 108.

Still referring to FIG. 1, a plurality of model-based definitions 116 may include information regarding geometric dimensioning and tolerancing. A plurality of model-based definitions 116 may include geometric dimensions and tolerances such as geometric tolerance, 3D annotation and dimensions, surface roughness, surface finish, material specifications, PMI, PLM, and the like. As used in this disclosure, a "geometric tolerance" is a quantified limit of allowable error of one or more physical attributes of a part for manufacture. Model-based definitions 116 may include a form tolerance such as straightness, flatness, circularity, and/or cylindricity; a profile tolerance such as profile of a line and/or profile of a surface; an orientation tolerance such as angularity, perpendicularity, and/or parallelism; location tolerance such as position, concentricity and/or symmetry; a runout tolerance such as circular runout and/or total runout; and the like. Geometric dimensioning and tolerancing may be included in a computer model 108 of part for manufacture 112 as symbols, annotations, numerical values, text, embedded information, and/or the like. As used in this disclosure, "text" includes letters, numbers, and/or symbols.

Continuing to refer to FIG. 1, model-based definitions 116 may include semantic information of part for manufacture 112. "Semantic information," as described in this disclosure, is data concerning and/or describing product and manufacturing information (PMI) and/or product life cycle management (PLM). PMI, as used in this disclosure, is data describing non-geometric attributes of a model of a part for manufacture, such as computer model 108, necessary for manufacturing the part, components of the part, and associated assemblies. For example and without limitation, PMI may include geometric dimensions and tolerances, 3D annotation and dimensions, surface finish, material specifications, and the like. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in computer model 108 may be used in processes generating a manufacturing estimate for the part to be manufactured.

Still referring to FIG. 1, model-based definitions 116 may be represented on a print. A print may include an image representing part for manufacture 112 or a component of the part for manufacture 112, a number representing a numerical tolerance of the component, and/or an indicator that identifies the numerical tolerance is associated with the component. Print may also indicate a unit of measurement and/or a scale, which may be included in model-based definitions 116. For example, GPU 104 may encode onto the computer model 108 or a print that the dimensions are in inches, and that the scale is "2:1", include a circle representing an exterior cylindrical surface of part for manufacture 112, and have an arrow pointing from "R0.5000+/−0.0003" to the circle. GPU 104 may be configured to insert "+/−" as a symbol representing a tolerance for the preceding number in the amount of the succeeding number. GPU 104 may also be configured to insert an arrow pointing from the numbers to the circle, the tolerance for the circle is detailed by the numbers, specifically the radius of the circle. GPU 104 may be configured to identify the unit of measurement stated in print and determine that the radius tolerance for the circle is +/−0.0003 inches.

With continued reference to FIG. 1, GPU 20 may include a frame buffer. As used in the current disclosure, a "frame buffer" is a portion of random-access memory (RAM) containing a bitmap that drives a video display. A Frame buffer may include a memory buffer containing data representing all the pixels in a complete video frame or the computer model 108. This circuitry converts an in-memory bitmap into a video signal that can be displayed on a computer monitor. The information in the buffer may consist of color values for every pixel to be shown on the display. Color values maybe stored in 1-bit binary (monochrome), 4-bit palettized, 8-bit palettized, 16-bit high color and 24-bit true color formats. An additional alpha channel is sometimes used to retain information about pixel transparency. The total amount of memory required for the frame buffer depends on the resolution of the output signal, and on the color depth or palette size.

With continued reference to FIG. 1, GPU 104 may be configured to generate a depth buffer model of representative part for manufacture 112. Depth buffer model of representative part for manufacture 112 further includes a depth buffer for each side of the plurality of sides of representative part for manufacture 112. The "depth buffer," as used in this disclosure, is a 2-dimensional image of representative part for manufacture 112 wherein each pixel, dexel, or multi-dixel carries the depth or the depths. The depth buffer may be generated by a process of rasterization, wherein the depth represents the traveling distance of where a ray hits the surface of the side of representative part for manufacture 112. Rays are shot from a side of representative part for manufacture 112 in the perpendicular direction. The depth buffer for each side of the plurality of sides is defined for only the visible area of each side of representative part for manufacture 112, wherein all surfaces of the part to be machined need to be visible from one of the sides in order to machine the part. GPU 104 may be further configured to generate a depth buffer for each side of the plurality of sides of representative part for manufacture 112. GPU 104 may further be configured to superimpose the depth buffer for each side of the plurality of sides of representative part for manufacture 112, wherein superimposing each depth buffer of the plurality of depth buffers creates depth buffer model. The "depth buffer model," as used in this disclosure, is the aggregate of each depth buffer of the plurality of depth buffers wherein the depth buffer model displays a 3-dimensional image of representative part for manufacture 112 as a function of the depth. Each depth buffer of the plurality of depth buffers defines a partial surface of representative part for manufacture 112 and depth buffer model constitutes the complete definition of representative part for manufacture 112. Persons skilled in the art, upon reviewing the entirety of this disclosure, will be aware of various depth buffers which may be suitable for use in a depth buffer model consistently with this disclosure.

Continuing to refer to FIG. 1, apparatus 100 may include assignment module operating on GPU 104. Assignment module may include any hardware and/or software module. Assignment module is configured to determine at least an orientation of representative part for manufacture 112 as a function of each depth buffer of the plurality of depth buffers. Orientation, as described herein, is a plane parallel to the direction of machining the part, wherein the plane may be positioned on any direction. The direction, as described herein, may include any axis as described in the entirety of this disclosure. The axis may include, as a non-limiting example, a three-axis coordinate system, such as the x-axis, y-axis, and z-axis, or abscissa, ordinate, and applicate. As a further non-limiting example, the axis may include a five-axis system, such as two rotation axis, x-axis, y-axis, and z-axis. The axis may include, as a further non-limiting example, any rotational axis as a function of the origin. In order to machine the entirety of the part, the at least an orientation needs to include planes to ensure all features of representative part for manufacture 112 are machined wherein features include any feature as described in the entirety of this disclosure. For example and without limitation, a cylindrical part may be machined in its entirety from the at least an orientation consisting of planes perpendicular to the rotational axis of the cylinder. As a further non-limiting example, a cylindrical part with a hole in one side may be machined in its entirety from the at least an orientation consisting on planes on perpendicular to the rotational axis of the cylinder and the radial axis. Persons skilled in the art, upon reviewing the entirety of this disclosure, will be aware of various planes which may be suitable for use the at least an orientation consistently with this disclosure.

With continued reference to FIG. 1, determining each orientation of the plurality of orientations may further include identifying at least an unreachable zone of depth buffer model. At least an "unreachable zone," as used in this disclosure, is a feature of a part which needs to be machined in the at least an orientation. Identifying the at least an unreachable zone of depth buffer model may include running digital filters on each depth buffer of the plurality of depth buffers of each side of representative part for manufacture 112. In an embodiment, the feature of a part which needs to be machined in the at least an orientation, may include a feature of a part which needs to be molded in the at least an orientation. A "digital filter," as described herein, is a system that performs mathematical operations on the depth buffer. For example without limitation, digital filter may include convolution filter, Wavelet transform, and Fast Fourier transform (FFT). For example and without limitation, identifying the at least an unreachable zone of depth buffer model may include applying a digital filter to the at least an orientation of the planes of −z-axis and +z-axis and subtracting the at least an orientation of the planes including the digital filters from the at least an orientation of the plane including the feature of the part to be machined. As a further example without limitation, identifying the at least an unreachable zone of depth buffer model may include applying a digital filter to the at least an orientation of the plane including the feature of the part to be machined and subtracting the at least an orientation of the planes including the digital filters from the at least an orientation of the plane including the feature of the part to be machined. Identifying the at least an unreachable zone of depth buffer model is performed for each feature of the plurality of features of representative part for manufacture 112.

With continued reference to FIG. 1, the GPU 104 may be configured to generate a manufacturability analysis 120. As used in the current disclosure, a "manufacturability analysis" is an evaluation of the manufacturability of the features of a part. Manufacturability is the degree to which a product can be effectively manufactured given its design, cost, distribution requirements, and the like. A manufacturability analysis 120 may be performed on each feature of the part to be manufactured 112 or the part to be manufactured 112 as a whole. Examples of a feature may include surfaces, edges, opening, shapes, sizes, and the like. In some embodiments, manufacturability analysis 120 may include a comparison of the manufacturer's capabilities to the model-based definitions 116 of the computer model 108. As used in the current disclosure, the "manufacturer's capabilities" are the manufacturer's ability to machine a given feature. A manufacturer's capabilities may be determined as a function of the equipment, staff, and experience that is available to the manufacturer. Manufacturer's capabilities may be determined as a function of the requested tolerances for the part compared to the current manufacturers capabilities to manufacture the part within those tolerances. In a non-limiting example, if the manufacturer's capabilities only allow for part to be manufactured 112 with tolerance for a given feature above +/−0.025 mm. A manufacturability analysis 120 may compare a part to be manufactured 112 has features that require a tolerance of +/−0.01 mm to the above mentioned manufacturer's capabilities. As a result the manufacturability analysis 120 may identify the feature as an unmanufacturable feature.

With continued reference to FIG. 1, a manufacturability analysis 120 may include a machineability verification. As used in this disclosure, "machineability verification" is a process of ensuring that model-based definitions 116 of the part to be manufactured 112 complies with certain constraints. For example without limitation manufacturer requirements, regulations, laws, building codes, safety standards, regulatory agency standards, and the like. In some cases, verification may include comparing the model-based definitions 116 of a part to be manufactured 112, such as without limitation against one or more acceptance criteria. For example, in some cases, a regulatory agency stated that the part to be manufactured 112 must be made out a material with a predetermined tensile strength, if the model-based definitions 116 state that the part be made out of a material with a tensile strength outside of the given range, the part 112 may not receive a machineability verification. Ensuring that part to be manufactured 112 is in compliance with the acceptance criteria may, in some cases, constitute verification. In some cases, verification may include ensuring that model-based definitions 116 is a complete description for the part 112, for example that all required data types, are present, readable, uncorrupted, and/or otherwise useful for GPU 104. In some cases, some or all verification processes may be performed by GPU 104 or GPU 104. In some cases, at least a machine-learning process, for example a machine-learning model, may be used to verify. GPU 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation.

With continued reference to FIG. 1, a manufacturability analysis 120 may be configured to identify unmanufacturable features of the part. As used in the current disclosure, an "unmanufacturable feature" is any quality of the part to be manufactured 112 causes the part to be determined as unmanufacturable. In a non-limiting example, unmanufacturable features may include work material considerations, time, cost, manufacturer's capabilities, set-up time to manufacture the part, load time, lead time, size considerations, and the like. GPU 104 may be configured to cross-reference the model-based definitions 116 of the part to be manufactured 112 with the manufacturer's capabilities to identify an unmanufacturable feature of the part. For example, a part to be manufactured 112 may include component that requires the manufacturer to machine the part out of metals that are notoriously difficult to work with, which may be reflected within the model-based definitions 116 for the part to be manufactured 112. Continuing with the example, the manufacturer's capabilities may denote that the manufacturer cannot work with this particular metal thus making the component unmanufacturable. A GPU 104 may also identify the time that it takes to set-up and machine the component and compare this to the cost to manufacture that component. If either the cost to make the component or the time it would take to make the component are unrealistic the component may be deemed unmanufacturable. The unmanufacturable features of the part may be displayed within the manufacturing quote or on the User device.

Still referring to FIG. 1, GPU 104 may be configured to display the manufacturability of a product as manufacturability score. As used in the current disclosure, a "manufacturability score" is a rating of the manufacturability of a component of a part for manufacture 112. An manufacturability score may be calculated on a numerical scale or an alphabetical scale, for instance a scale from 1-10. In a non-limiting example, a score of 1 may be a easily manufactured component of a part for manufacture 112, whereas a rating of 10 may be extremely difficult to manufacture. An manufacturability score may be awarded to each feature of the part to be manufactured 112. A manufacturability score may be generated by comparing the manufacturing specifications 124 and model-based definitions 116 of the component of the part to be manufactured 112. In a non-limiting example, the model-based definitions 116 may identify a component needing a highly specialized finishing process and manufacturing specifications 124 may identify that the manufacturer specializes in the aforementioned finishing process, however it requires a six week lead time. GPU 104 may compare the manufacturing specifications 124 and model-based definitions 116 to produce an manufacturability score of 8 out of 10. In some embodiments, a manufacturability score may be generated as a using a machine learning model such as manufacturability machine learning model. In these embodiments, manufacturability training data may include as outputs manufacturability scores. In some embodiments, generating the manufacturability score may include linear regression techniques. GPU 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, a manufacturability analysis 120 may include the generation of a manufacturing quote. As used in the current disclosure, a "manufacturing quote" is a report detailing the dimensions of the part and the manufacturability of the part to be manufactured 112. A manufacturing quote may also include the geometrical tolerances to go with each feature of the part and the ability of the manufacturer to deliver those geometrical tolerances. A manufacturing quote may include a recommendation of which work materials to use to manufacture the part out of. In some embodiments, a manufacturing quote may include suggested methods of assembly for the part. A manufacturing quote may also include suggestions on the most efficient order of assembly for the part. Manufacturing quotes may also denote that the part is unable to be manufactured due to issues regarding manufacturing specifications 124 and model-based definitions 116. Additionally, a manufacturing quote may make suggestions on corrections to an unmachinable part in order to make it manufacturable. These suggestions may include increasing the tolerances for various features, or changing the material of the part, using other machining tools. A manufacturing quote may detail a price to manufacture the part in various quantities. A manufacturing quote may display a lead time to manufacture the part in various quantities. A manufacturing quote may also identify the a quantity of labor time that is required by the manufacturer to generate.

With continued reference to FIG. 1. GPU 104 may generate a manufacturability analysis 120 as a function of the plurality of the model based definitions 116 using a manufacturability classifier. As used in the current disclosure, a "manufacturability classifier" is a machine-learning model that sorts inputs into categories or bins of data, outputting the categories or bins of data and/or labels associated therewith. Manufacturability classifier may be consistent with the classifier described below in FIG. 2. Inputs to the manufacturability classifier may include a plurality of model-based definitions 116, a computer model 108, previous manufacturability analysis 120, previous unmanufacturable features, previous manufacturing quotes, previous manufacturability scores, manufacturers capabilities, and the like. The output of the manufacturability classifier may comprise a manufacturability analysis 120 that is specific to the given part 112. Manufacturability training data is a plurality of data entries containing a plurality of inputs that are correlated to a plurality of outputs for training a processor by a machine-learning process to classify a plurality of model-based definitions 116 to the manufacturers capabilities. Manufacturability training data may be received from a database such as machineability database 300 of FIG. 3. Manufacturability training data contains a plurality of data entries containing a model-based definitions 116 and manufacturers capabilities as an input correlated to a plurality of manufacturability analysis 120 as an output. Manufacturability training data may also correlate an example of manufacturability analysis 120 and an example of model-based definitions 116 as an input correlated to a part-specific manufacturability analysis 120 as an output. Manufacturability training data may contain information about plurality of model-based definitions 116, a computer model 108, previous manufacturability analysis 120, previous unmanufacturable features, previous manufacturing quotes, previous manufacturability scores, manufacturers capabilities, and the like. Manufacturability training data may be generated from any past user manufacturability analysis 120, previous unmanufacturable features, previous manufacturing quotes, previous model-based definitions 116, and the like. In a non-limiting example, the "example of a manufacturability analysis" and the "example of model-based definitions" may be prior a prior manufacturability analysis 120 and model-based definitions 116, respectively. In some embodiments, a Manufacturability training data may be iteratively updated with in the input and output results of the manufacturability classifier using a feedback loop. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Manufacturability classifier may include algorithms based on decision trees, such as decision tree classification or regression algorithms. Manufacturability classifier may include ensemble methods such as bagging meta-estimator, forest of randomized tress, AdaBoost, gradient tree boosting, and/or voting classifier methods. Manufacturability classifier s may include neural net algorithms, including convolutional neural net processes.

Still referring to FIG. 1, processor may be configured to generate a machine learning model, such as manufacturability classifier, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. GPU 104 may then calculate a likelihood table by calculating probabilities of different data entries and classification labels. GPU 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, GPU 104 may be configured to generate a machine learning model, such as manufacturability classifier, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, a classifier, such as manufacturability classifier, may be implemented as a fuzzy inferencing system. As used in the current disclosure, a "fuzzy inference" is a method that interprets the values in the input vector (i.e., model-based definitions 116 and manufacturers capabilities.) and, based on a set of rules, assigns values to the output vector. A set of fuzzy rules may include a collection of linguistic variables that describe how the system should make a decision regarding classifying an input or controlling an output. Examples of this may include two variables, one representing a model-based definition 116 requiring a certain finish on the part 112 and a second variable representing an increment of labor time according to the manufacturers capabilities. A non-limiting example of this may be requiring a polished finish on the part 112 while anticipating the number of man hours to machine the part 112. Additionally, A manufacturability analysis 120 may for example, represent a degree of match between a first fuzzy set and a second fuzzy set, and/or single values therein with each other or with either set, which is sufficient for purposes of the matching process. A manufacturability analysis 120 may indicate a sufficient degree of overlap with a fuzzy set representing a model-based definition 116 and a second fuzzy set representing the manufacturers capabilities.

With continued reference to FIG. 1, GPU 104 may be configured to generate an adjusted computer model 124 as a function of the manufacturability analysis and the computer model. As used in the current disclosure, an "adjusted computer model" is a computer model 108 that every feature is machinable. In some embodiments, an adjusted computer model 124 may include one or more altered model based definitions 116 as compared to the computer model 108. In a non-limiting example, the model based definitions 116 of the part 112 may require that an opening that is 0.02 mm in diameter. The manufacturability analysis 120 may indicate that the manufacturer may only generate parts with an opening greater than 0.5 mm in diameter. GPU 104 may generate the adjusted computer model 124 a model based definition 116 for the opening of 0.5 mm. An adjusted computer model 124 may adjust model based definition 116 including material, size of features, finish, depth of an opening, the manufacturing process, and the like.

With continued reference to FIG. 1, adjusted computer model 124 may be generated as a function of manufacturing time. A "manufacturing time," as used in the current disclosure, is the time required to manufacture a part to be manufactured 112 in a given quantity. In a non-limiting example, if the manufacturing time for the part to be manufactured 112 is above a given threshold the GPU 104 may reduce, remove, or replace some of time consuming features with less time consuming features within the adjusted computer model 124 . . . . In some embodiments, a adjusted computer model 124 may be generated as a function of manufacturing cost. A "manufacturing cost," as used in the current disclosure, is the cost required to manufacture a part to be manufactured 112 in a given quantity. In a non-limiting example, if the manufacturing cost for the part to be manufactured 112 is above a given threshold the GPU 104 may reduce, remove, or replace some of the high cost features within the adjusted computer model 124. In embodiments manufacturing time and manufacturing cost may be determined within the manufacturability analysis 120. In a non-limiting example, several factors may contribute to manufacturing costs, they may include materials, labor cost, manufacturing time, size of the part 112, detail within the part 112, tolerances within the part 112, and the like.

With continued reference to FIG. 1, GPU 104 may be configured to place the adjusted computer model 124 through an approval protocol. As used in the current disclosure, an "approval protocol" is a process wherein the user approves the changes to the model based definition 116 before the product is manufactured. GPU 104 may initiate an approval protocol by alerting the user of the presence of an adjusted computer model 124. The alert may include an email, push notification, message, text message, audio alerts, and the like. The user may be notified of any adjustments to the model based definitions 116 within the adjusted computer model 124 and an identification of any unmanufacturable features within the original computer model 108.

With continued reference to FIG. 1, GPU 104 may be configured to generate an adjusted computer model 124 using a using an adjustment machine learning model. As used in the current disclosure, a "adjustment machine learning model" is a mathematical and/or algorithmic representation of a relationship between inputs and outputs. In some embodiments, an adjustment machine learning model may comprise a classifier. A adjustment machine learning model may be consistent with the machine learning model as described herein below in FIG. 2. Inputs to the machine learning model may include a plurality of model-based definitions 116, computer model 108, manufacturability analysis 120, unmanufacturable features, manufacturing quotes, manufacturability scores, manufacturers capabilities, previous adjusted computer model 124, and the like. This data may be received from a database, such as machinability database 300. Adjustment machine learning model may by trained using adjustment training data. Adjustment training data is a plurality of data entries containing a plurality of inputs that are correlated to a plurality of outputs for training a GPU 104 by a machine-learning process. Adjustment training data may include a plurality of model-based definitions 116, computer model 108, manufacturability analysis 120, unmanufacturable features, manufacturing quotes, manufacturability scores, manufacturers capabilities, previous adjusted computer model 124, and the like. Adjustment training data may be stored in a database, such as a training data database, or remote data storage device, or a user input or device.

With continuing reference to FIG. 1, GPU 104 may be configured to generate an adjusted computer model a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least an entry indication. Decision tree may also have at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. In an embodiment, an internal node of a decision tree may comprise the output of a machine learning model. Machine learning model may include any machine learning model mentioned herein below. (i.e., manufacturability classifier and/or adjustment machine learning model) GPU 104 may generate two or more decision trees, which may overlap; for instance, a root node of one tree may connect to and/or receive output from one or more terminal nodes of another tree, intermediate nodes of one tree may be shared with another tree, or the like.

Still referring to FIG. 1, GPU 104 may build decision tree by following relational identification; for example, relational indication may specify that a first rule module receives an input from at least a second rule module and generates an output to at least a third rule module, and so forth, which may indicate to GPU 104 an in which such rule will be placed in decision tree. Building decision tree may include recursively performing mapping of execution results output by one tree and/or subtree to root nodes of another tree and/or subtree, for instance by using such execution results as execution parameters of a subtree. In this manner, GPU 104 may generate connections and/or combinations of one or more trees to one another to define overlaps and/or combinations into larger trees and/or combinations thereof. Such connections and/or combinations may be displayed using a GUI to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Figure 2:
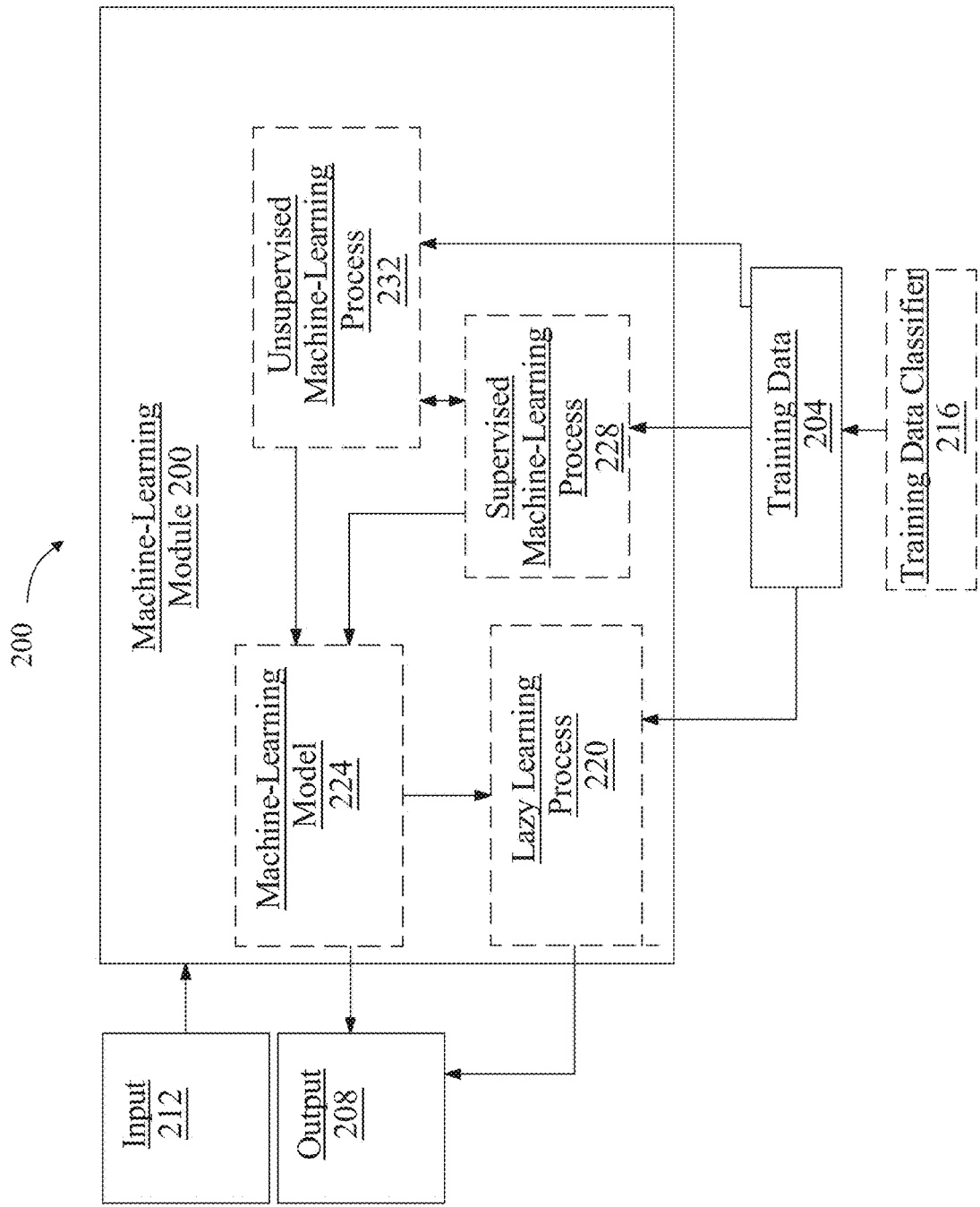
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
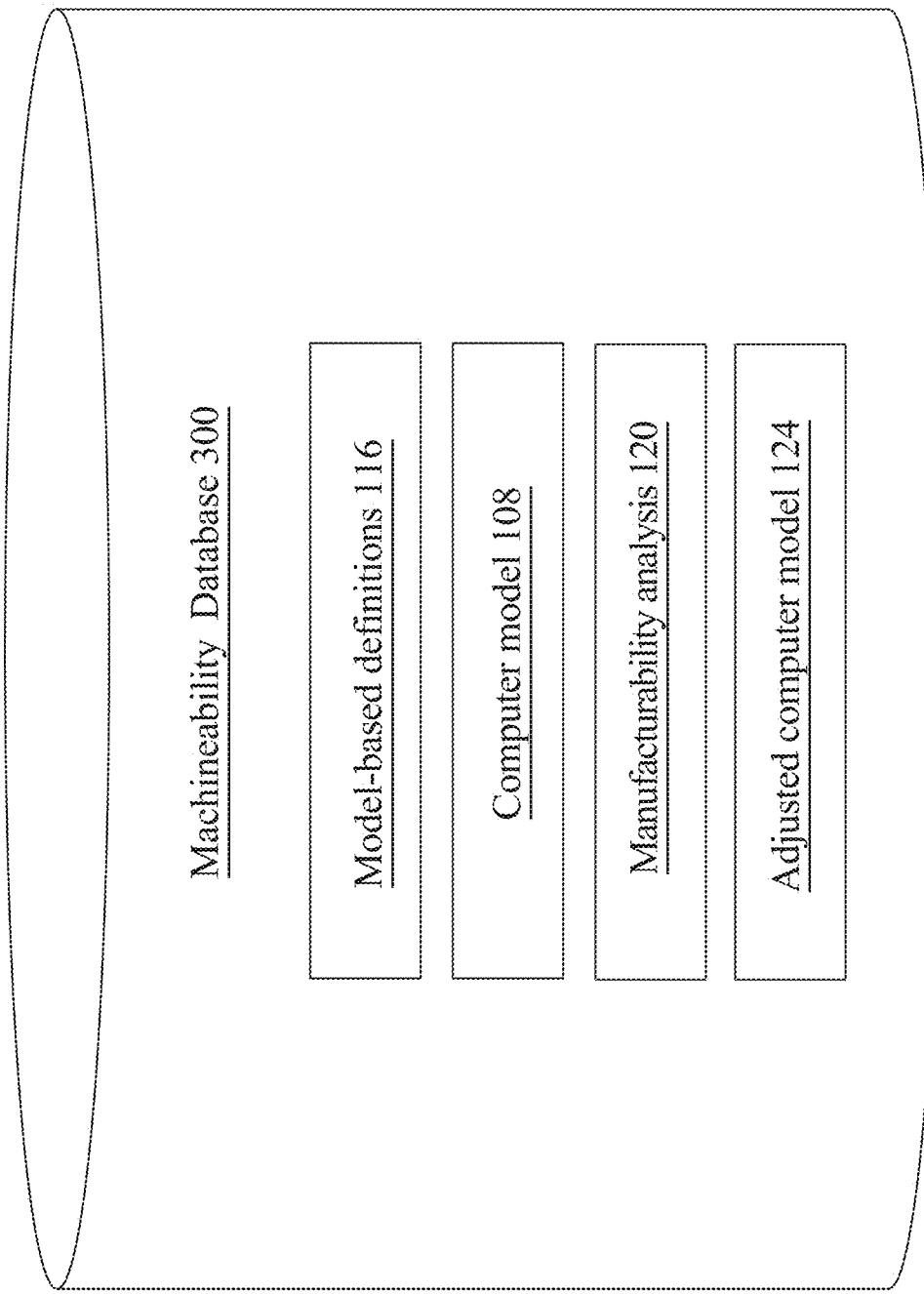
FIG. 3 is a block diagram of an exemplary embodiment of a machinability database.

Now referring to FIG. 3, an exemplary machineability database 300 is illustrated by way of block diagram. In an embodiment, any data disclosed herein may be stored within machinability database 300, including a plurality of model-based definitions 116, computer model 108, manufacturability analysis 120, unmanufacturable features, manufacturing quotes, manufacturability scores, manufacturers capabilities, adjusted computer model 124, adjustment training data, manufacturability training data, the like. GPU 104 may be communicatively connected with machineability database 300. For example, in some cases, database 300 may be local to GPU 104. Alternatively or additionally, in some cases, database 300 may be remote to GPU 104 and communicative with GPU 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure GPU 104 connect directly, dynamically, and non-hierarchically to as many other computing devices as possible. A "network topology" as used in this disclosure is an arrangement of elements of a communication network. Machineability database 300 may be implemented, without limitation, as a relational database, a key-value retrieval database such as a NOSQL database, or any other format or structure for use as a database that a person skilled in the art would recognize as suitable upon review of the entirety of this disclosure. Machineability database 300 may alternatively or additionally be implemented using a distributed data storage protocol and/or data structure, such as a distributed hash table or the like. Machineability database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database May store, retrieve, organize, and/or reflect data and/or records as used herein, as well as categories and/or populations of data consistently with this disclosure.

Figure 4:
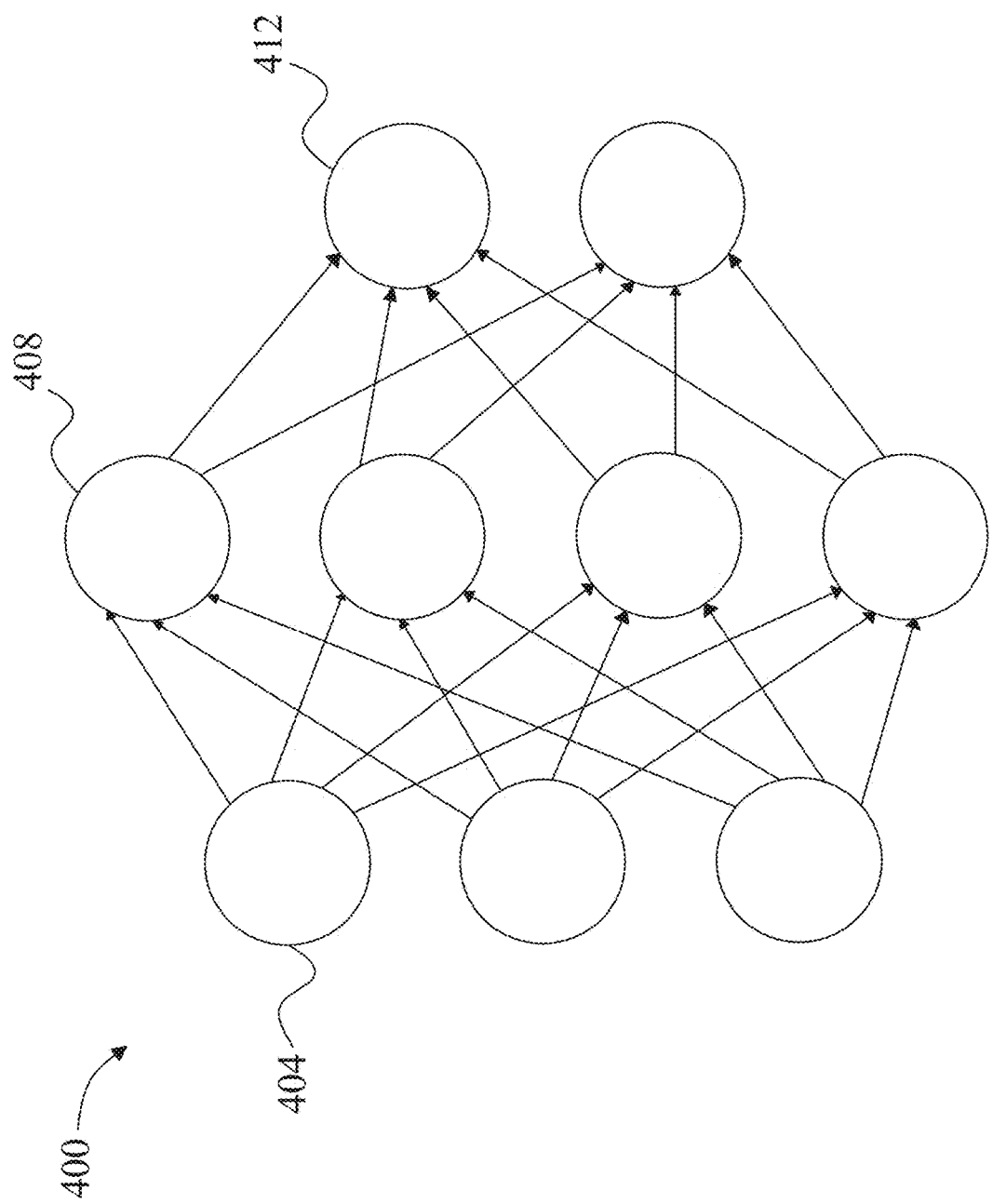
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
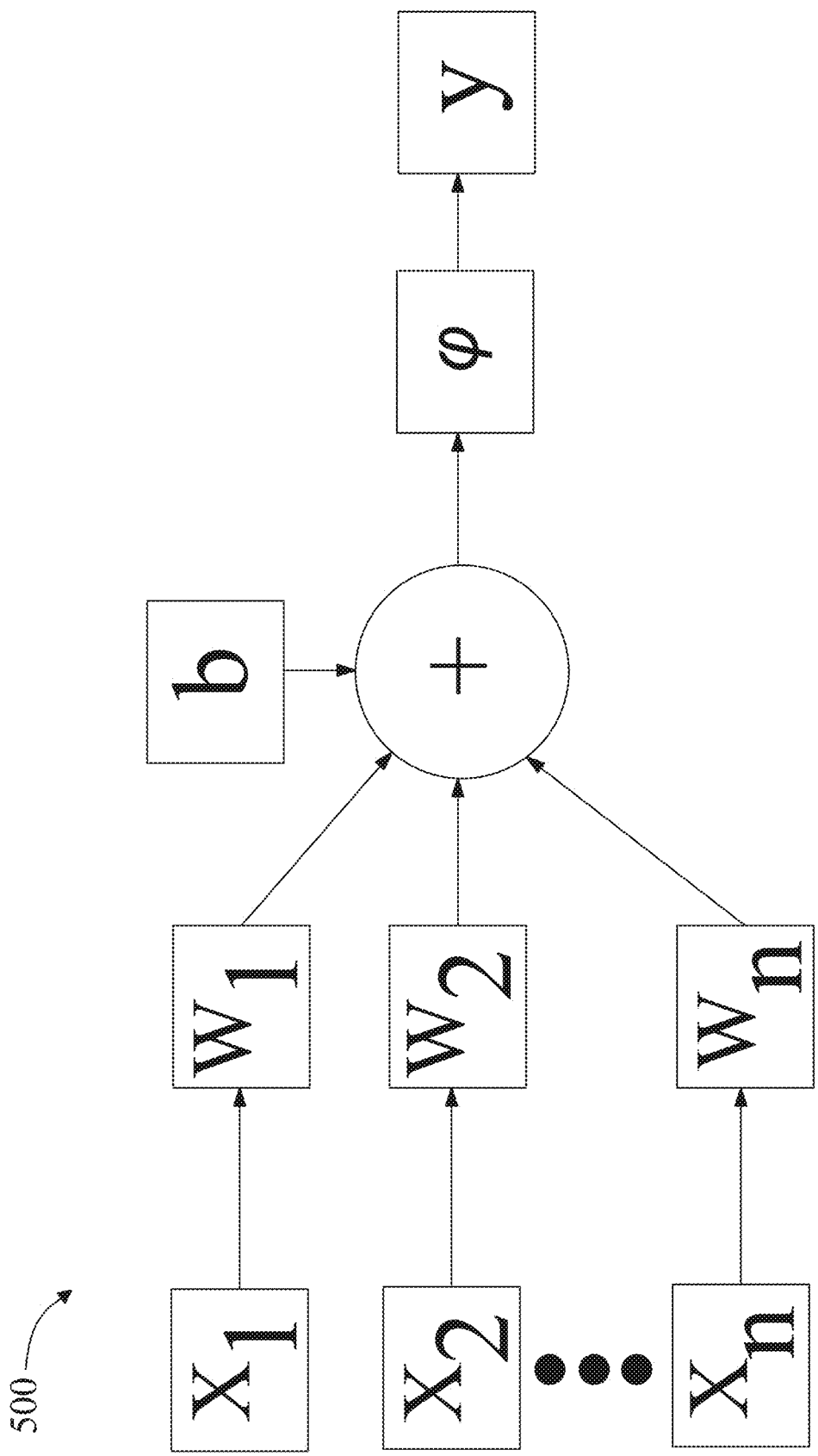
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
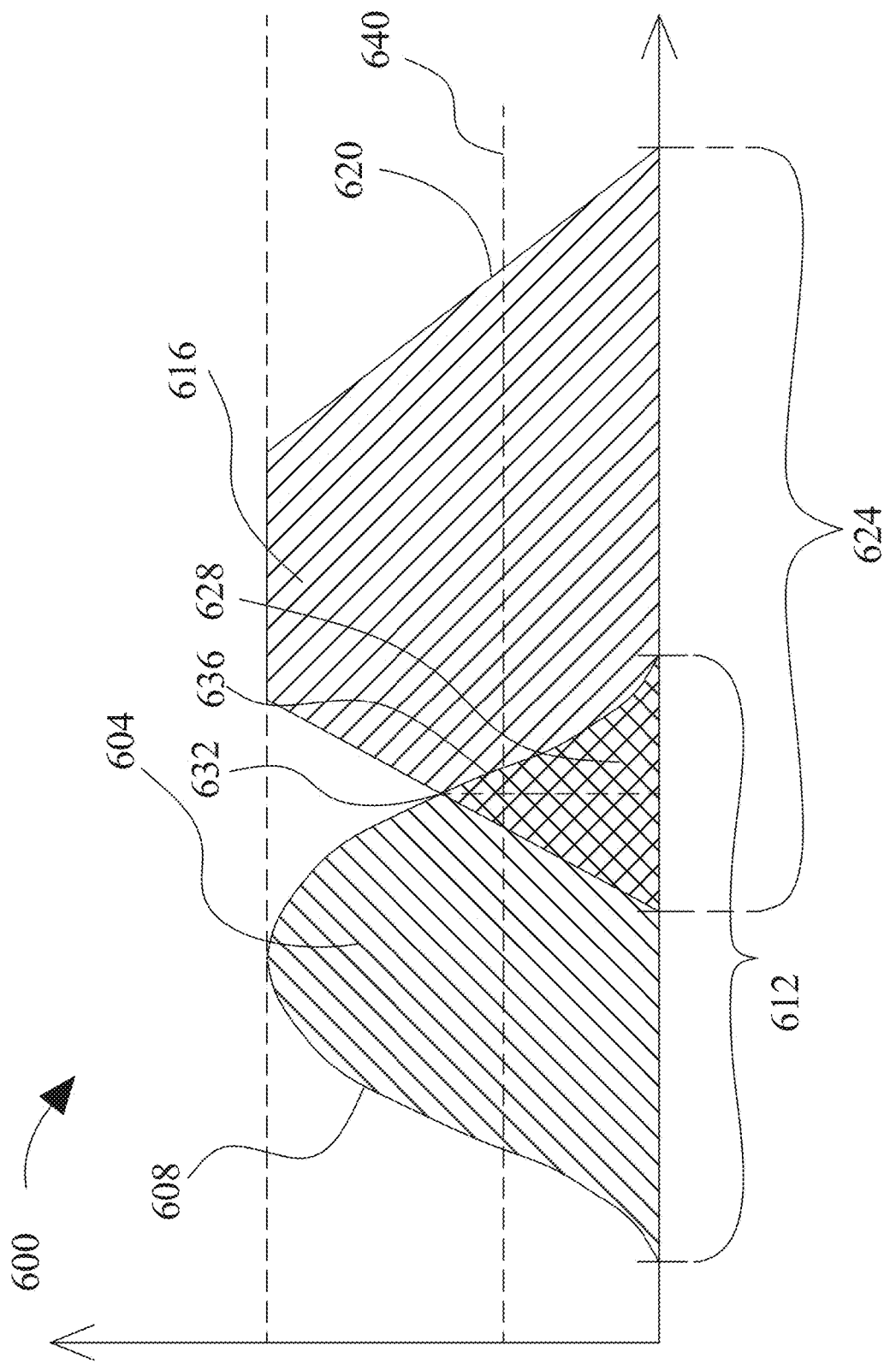
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent model-based definition 116, unmanufacturable features, and/or manufacturers capabilities from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input and/or model-based definitions 116, and/or manufacturers capabilities. For instance, an acceptance variable may represent a first measurable value pertaining to the classification of an model-based definitions 116 to an manufacturers capabilities. Continuing the example, an output variable may represent an manufacturability analysis 120 specific the current part 112. In an embodiment, model-based definitions 116 and/or manufacturers capabilities may be represented by their own fuzzy set. In other embodiments, manufacturability analysis 120 specific to the part 112 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥ (b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any model-based definitions 116, computer model 108, manufacturability analysis 120, unmanufacturable features, manufacturing quotes, manufacturability scores, manufacturers capabilities, adjusted computer model 124, and the like. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, a manufacturability analysis 120 may indicate a sufficient degree of overlap with the model-based definitions 116 and the an manufacturers capabilities for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both manufacturers capabilities and model-based definitions 116 have fuzzy sets, a manufacturability analysis 120 may be classified as an manufacturers capabilities by having a degree of overlap exceeding a predictive threshold, GPU 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
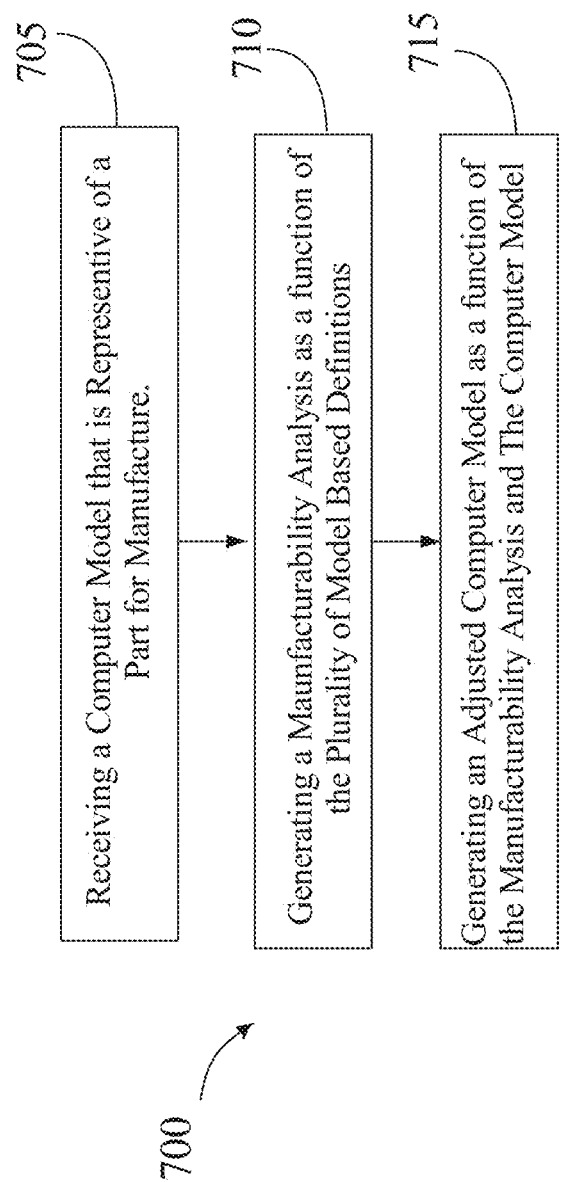
FIG. 7 is a flow diagram of an exemplary method for generating a manufacturability analysis.

Referring to FIG. 7, an exemplary method 700 for generating a manufacturability analysis. Method 700 includes a step 705 of receiving, using at least a processor, a computer model that is representative of a part for manufacture, wherein the computer model comprises a plurality of model based definitions. This may be implemented in accordance with FIGS. 1-6. In some embodiments, the plurality of the model based definitions comprises geometric dimensioning and tolerances.

With continued reference to FIG. 7, method 700 includes a step 710 of generating, using the GPU, a manufacturability analysis as a function of the plurality of the model based definitions, wherein the manufacturability analysis is generated using the GPU. This may be implemented in accordance with FIGS. 1-6. In some embodiments, the manufacturability analysis may include machinability verification, a manufacturing quote, and/or a manufacturing quote. In other embodiments, the manufacturability analysis may be displayed as a manufacturability score.

With continued reference to FIG. 7, method 700 includes a step 715 of generating, using the at least a processor, an adjusted computer model as a function of the manufacturability analysis and the computer model. This may be implemented in accordance with FIGS. 1-6. In some embodiments, the adjusted computer model may be generated as a function of the manufacturability score, manufacturing time, and/or manufacturing cost. In other embodiments, generation of the adjusted computer model may include adjusting the plurality of model based definitions.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
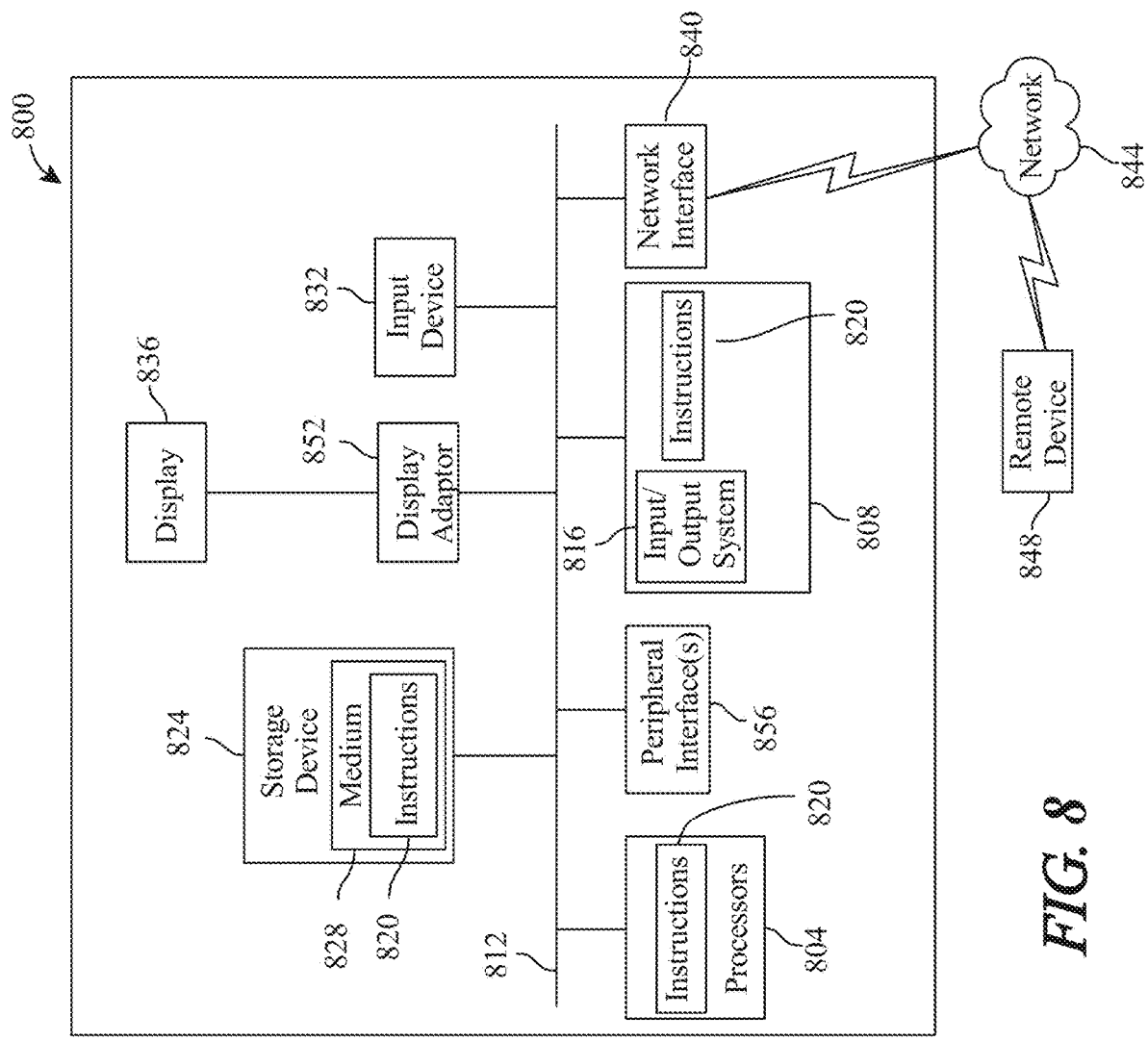
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating a manufacturability analysis, wherein the apparatus comprises:
   at least a graphics processing unit (GPU); and
   a memory communicatively connected to the at least a GPU, the memory containing instructions configuring the at least a GPU to:
   receive a computer model that is representative of a part for manufacture, wherein the computer model comprises a plurality of model based definitions;
   generate a depth buffer model of the part for manufacture, wherein the depth buffer model further comprises a plurality of depth buffers, wherein each depth buffer of the plurality of depth buffers defines a partial surface of the representative part for manufacture;
   generate a plurality of orientations based at least on the plurality of depth buffers, wherein generating the plurality of orientations comprises identifying at least an unreachable zone of the depth buffer model for each orientation of the plurality of orientations, wherein the at least unreachable zone is a feature that is required to be machined in each orientation of the plurality of the orientations;
   generate a manufacturability analysis as a function of the plurality of the model based definitions using a manufacturability classifier, wherein the manufacturability classifier is trained as a function of manufacturability training data, wherein the manufacturability training data comprises a plurality of data entries, wherein the plurality of data entries each including at least a model-based definition as an input correlated to a manufacturability analysis as an output, and wherein the manufacturability training data is iteratively updated with results of the manufacturability classifier using a feedback loop;
   generate an adjusted computer model as a function of the manufacturability analysis and the computer model;
   initiate an approval protocol based on the adjusted computer model, wherein the approval protocol includes an alert comprising an identification of existing unmanufacturable features within the adjusted computer model to a user; and
   wherein the adjusted computer model is generated using an adjustment machine learning model.

2. The apparatus of claim 1, wherein the manufacturability analysis is generated as a function of a tolerance datum.

3. The apparatus of claim 1, wherein the manufacturability analysis is generated as a function of a material datum.

4. The apparatus of claim 1, wherein the manufacturability analysis comprises generating a manufacturability quote.

5. The apparatus of claim 1, wherein the manufacturability analysis comprises generating a manufacturability score.

6. The apparatus of claim 5, wherein the adjusted computer model is generated as a function of the manufacturability score.

7. The apparatus of claim 1, wherein the adjusted computer model is generated as a function of manufacturing time.

8. The apparatus of claim 1, wherein the adjusted computer model is generated as a function of manufacturing cost.

9. The apparatus of claim 1, wherein generation of the adjusted computer model comprises adjusting the plurality of model based definitions.

10. A method for generating a manufacturability analysis, wherein the method comprises:
    receiving, using at least a graphics processing unit (GPU), a computer model that is representative of a part for manufacture, wherein the computer model comprises a plurality of model based definitions;
    generating a depth buffer model of the part for manufacture, wherein the depth buffer model further comprises a plurality of depth buffers, wherein each depth buffer of the plurality of depth buffers defines a partial surface of the representative part for manufacture;
    generating a plurality of orientations based at least on the plurality of depth buffers, wherein generating the plurality of orientations comprises identifying at least an unreachable zone of the depth buffer model for each orientation of the plurality of orientations, wherein the at least unreachable zone is a feature that is required to be machined in each orientation of the plurality of the orientations;
    generating, using the at least a GPU, a manufacturability analysis as a function of the plurality of model based definitions, using a manufacturability classifier, wherein the manufacturability classifier is trained as a function of manufacturability training data, wherein the manufacturability training data comprises a plurality of data entries, the plurality of data entries each including at least a model-based definition as an input correlated to a manufacturability analysis as an output, wherein the manufacturability training data is iteratively updated with results of the manufacturability classifier using a feedback loop, and wherein the manufacturability analysis is generated using the GPU;
    generating, using the at least a GPU, an adjusted computer model as a function of the manufacturability analysis and the computer model;
    initiating, using the at least a GPU, an approval protocol based on the adjusted computer model, wherein the approval protocol includes an alert comprising an identification of existing unmanufacturable features within the adjusted computer model to a user; and wherein the adjusted computer model is generated using an adjustment machine learning model.

11. The method of claim 10, wherein the plurality of the model based definitions comprises geometric dimensioning and tolerances.

12. The method of claim 10, wherein the manufacturability analysis comprises a machinability verification.

13. The method of claim 10, wherein the manufacturability analysis comprises generating a manufacturing quote.

14. The method of claim 10, wherein the manufacturability analysis comprises generating a manufacturability score.

15. The method of claim 14, wherein the adjusted computer model is generated as a function of the manufacturability score.

16. The method of claim 10, wherein the adjusted computer model is generated as a function of manufacturing time.

17. The method of claim 10, wherein the adjusted computer model is generated as a function of manufacturing cost.

18. The method of claim 10, wherein generation of the adjusted computer model comprises adjusting the plurality of model based definitions.

* * * * *